(12) United States Patent
Worsham, Jr.

(10) Patent No.: US 11,850,886 B2
(45) Date of Patent: Dec. 26, 2023

(54) TIRE TRACTION ASSEMBLY

(71) Applicant: Zedekiah Worsham, Jr., Chicago, IL (US)

(72) Inventor: Zedekiah Worsham, Jr., Chicago, IL (US)

( * ) Notice: Subject to any disclaimer, the term of this patent is extended or adjusted under 35 U.S.C. 154(b) by 286 days.

(21) Appl. No.: 17/464,015

(22) Filed: Sep. 1, 2021

(65) Prior Publication Data

US 2023/0062420 A1    Mar. 2, 2023

(51) Int. Cl.
*B60B 39/12* (2006.01)
*B60B 39/00* (2006.01)

(52) U.S. Cl.
CPC ............... *B60B 39/12* (2013.01); *B60B 39/00* (2013.01); *B60B 2900/721* (2013.01)

(58) Field of Classification Search
CPC ......... B60B 39/00; B60B 39/02; B60B 39/12; B60B 15/00; B60B 2900/721; B60C 27/00; E01C 9/08; E01C 9/083; E01C 9/086
See application file for complete search history.

(56) References Cited

U.S. PATENT DOCUMENTS

| | | | | |
|---|---|---|---|---|
| 2,443,319 A | * | 6/1948 | Mack | B60B 39/12 D5/1 |
| 2,577,890 A | * | 12/1951 | Hardy | B60B 39/12 52/180 |
| 2,975,977 A | | 3/1961 | Chodacki | |
| 3,640,459 A | | 2/1972 | Preisler | |
| 3,749,309 A | | 7/1973 | Becker | |
| 3,786,989 A | * | 1/1974 | Haynes | B60B 39/12 238/14 |
| 3,878,988 A | * | 4/1975 | Blais | B60B 15/00 238/14 |
| 4,061,268 A | * | 12/1977 | DeMaster | B60B 39/12 238/14 |
| 4,223,835 A | | 9/1980 | Witt | |
| 4,265,399 A | * | 5/1981 | Covington | B60B 39/12 238/14 |
| 5,538,183 A | | 7/1996 | McGee | |
| D464,304 S | | 10/2002 | Wright | |
| 8,448,877 B1 | * | 5/2013 | Aubin | B60C 27/00 238/14 |
| D775,068 S | | 12/2016 | Wippler | |

(Continued)

FOREIGN PATENT DOCUMENTS

| | | | | |
|---|---|---|---|---|
| WO | WO2020191433 | | 10/2020 | |
| WO | WO-2020191433 A1 | * | 10/2020 | ............. B60B 39/12 |

*Primary Examiner* — S. Joseph Morano
*Assistant Examiner* — Cheng Lin

(57) ABSTRACT

A tire traction assembly for enhancing traction of vehicle tires on a slippery driving surface includes a pair of traction frames that can each be positioned on a slippery driving surface upon which a vehicle is not capable of driving due to a loss of traction. A plurality of nets is each integrated into a respective one of the traction frames. The plurality of nets includes a set of top nets and a set of bottom nets. Moreover, each of the set of top nets frictionally engages a respective vehicle tire and each of the bottom nets frictionally engages the slippery driving surface when the traction frames are positioned on the slippery driving surface. Additionally, each of the top nets and each of the bottom nets is comprised of a resilient material to resist being deformed by the weight of the vehicle tire.

7 Claims, 3 Drawing Sheets

(56) References Cited

U.S. PATENT DOCUMENTS

| | | | | |
|---|---|---|---|---|
| 2004/0056107 A1* | 3/2004 | Jones | ................... | B60B 39/12 |
| | | | | 238/14 |
| 2013/0008972 A1* | 1/2013 | Lubinitsky | ............ | B60B 39/12 |
| | | | | 238/14 |
| 2016/0121653 A1* | 5/2016 | Letarte | .................. | B60B 39/12 |
| | | | | 238/14 |

\* cited by examiner

TIRE TRACTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to traction devices and more particularly pertains to a new traction device for enhancing traction of a vehicle on a slippery driving surface. The device includes a pair of traction frames which each has an open end that is positionable in front of a respective drive wheel of a vehicle. The device further includes a plurality of nets, each being comprised of a resilient material, which is each integrated into a respective traction frame. Respective ones of the nets frictionally engage the slippery driving surface and the respective drive wheel. In this way the traction device facilitates the vehicle to gain traction on the slippery driving surface.

(2) Description of Related Art Including Information Disclosed Under 37 CFR 1.97 and 1.98

The prior art relates to traction devices including a variety of traction ramps that are positionable in front of a tire on a vehicle for elevating the tire over a slippery driving surface. The prior art discloses a traction panel that has spikes integrated into a bottom side of the traction panel to engage a slippery driving surface. The prior art discloses a variety of traction panel devices that each includes a plurality of protrusions on a top side of the device and plurality of protrusions on a bottom side of the device. The prior art discloses a traction panel device that includes walls extending upwardly along either side of the traction panel device for guiding a tire of a vehicle along the traction panel device.

BRIEF SUMMARY OF THE INVENTION

An embodiment of the disclosure meets the needs presented above by generally comprising a pair of traction frames that can each be positioned on a slippery driving surface upon which a vehicle is not capable of driving due to a loss of traction. A plurality of nets is each integrated into a respective one of the traction frames. The plurality of nets includes a set of top nets and a set of bottom nets. Moreover, each of the set of top nets frictionally engages a respective vehicle tire and each of the bottom nets frictionally engages the slippery driving surface when the traction frames are positioned on the slippery driving surface. Additionally, each of the top nets and each of the bottom nets is comprised of a resilient material to resist being deformed by the weight of the vehicle tire.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
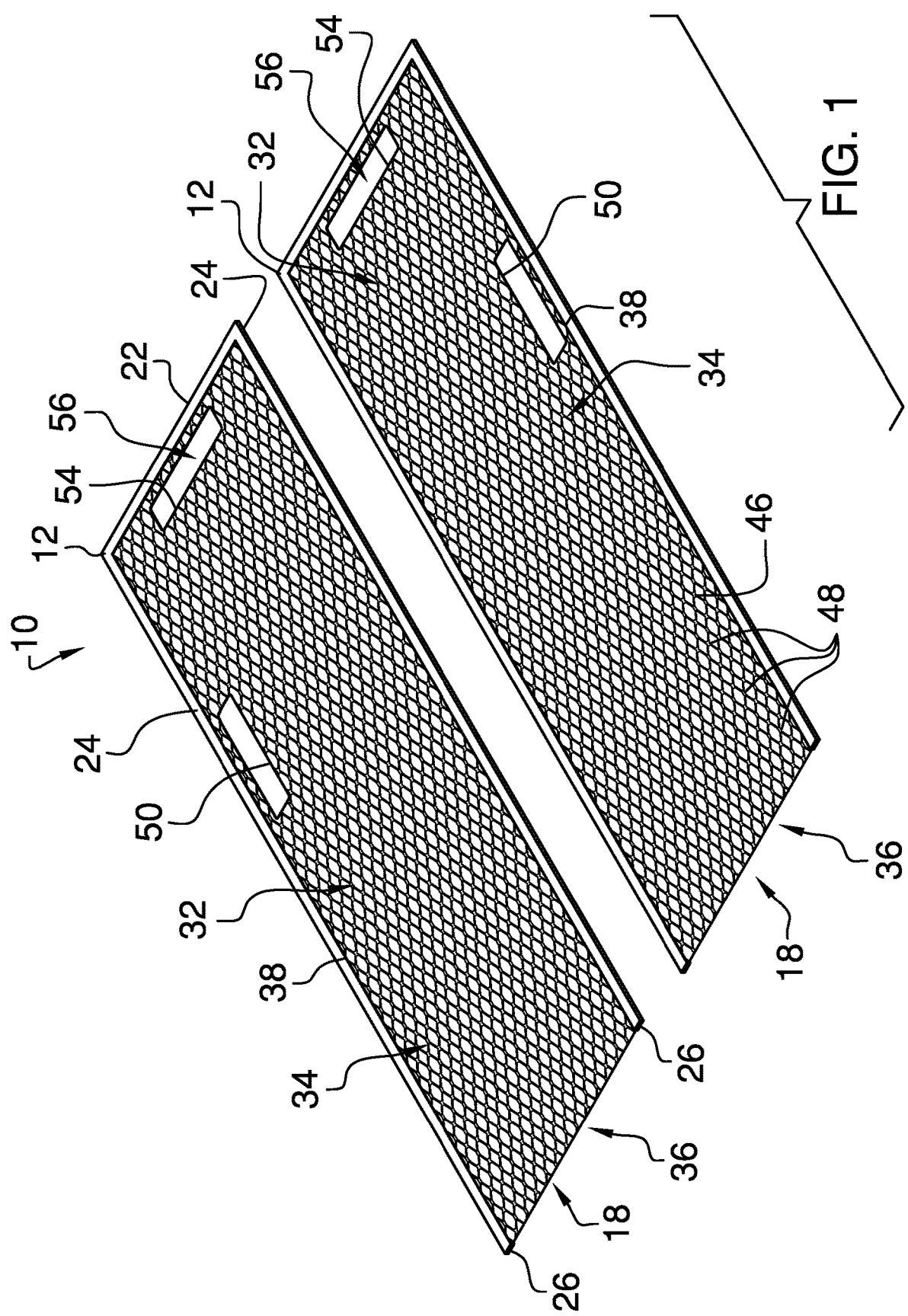
FIG. 1 is a top perspective view of a tire traction assembly according to an embodiment of the disclosure.
Figure 3:
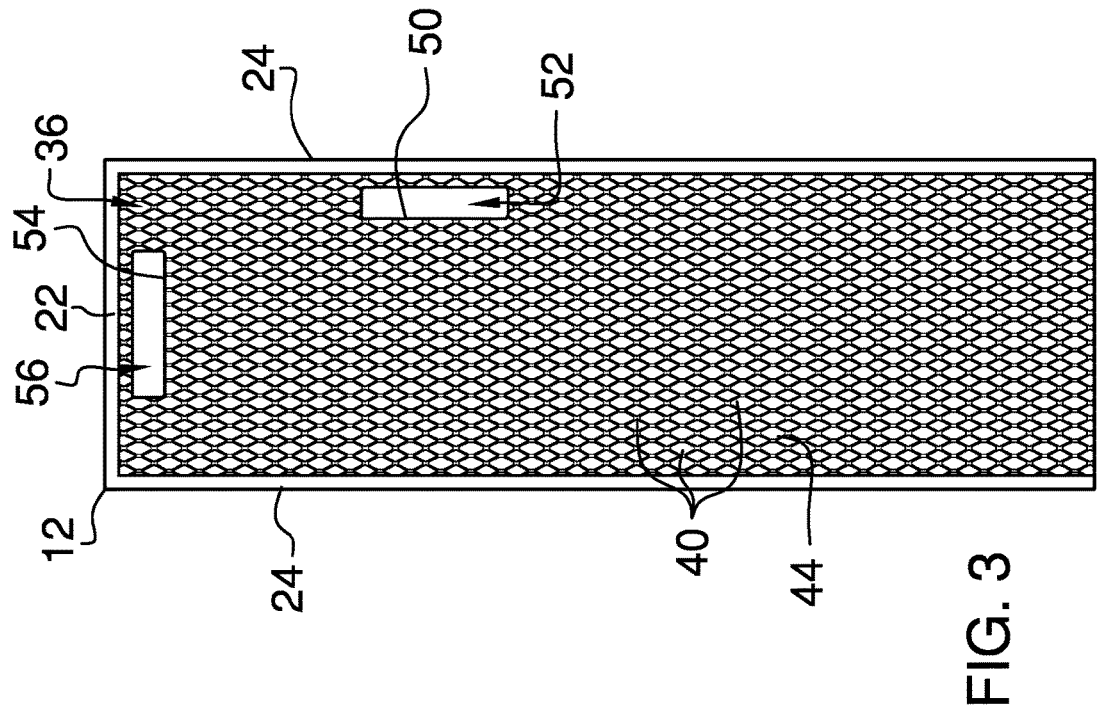
FIG. 3 is a bottom view of an embodiment of the disclosure.
Figure 2:
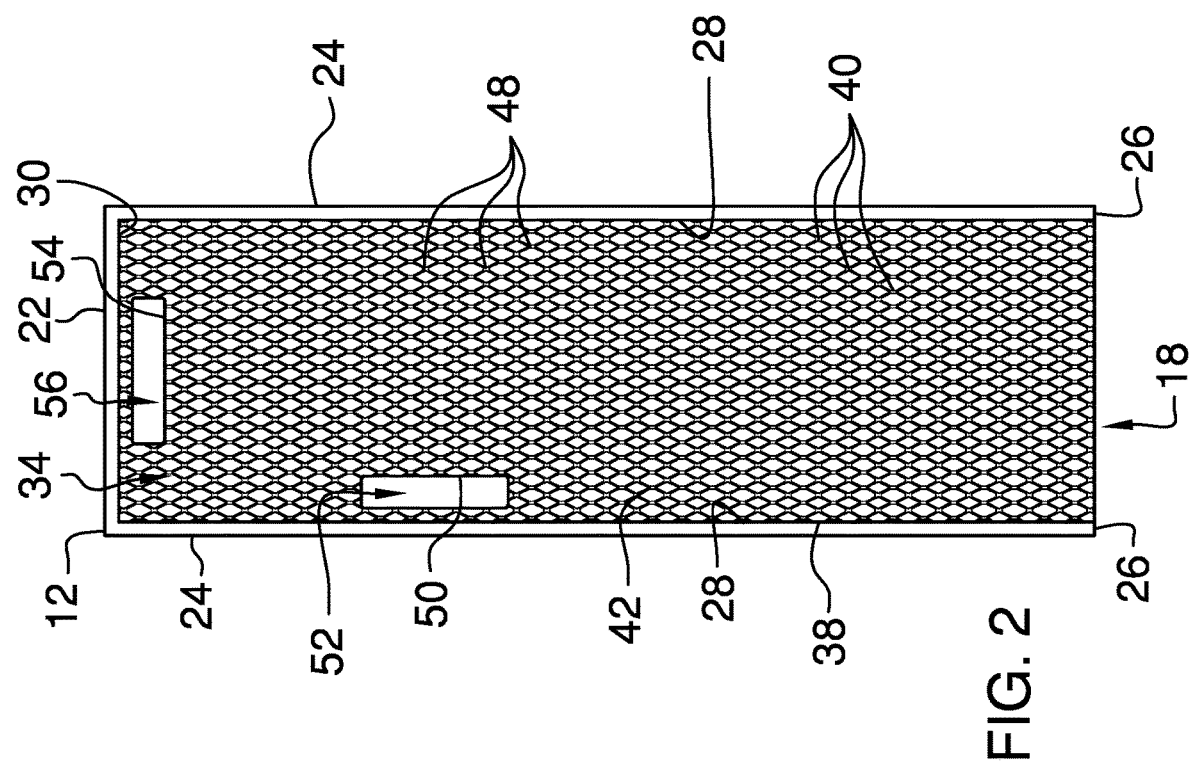
FIG. 2 is a top view of an embodiment of the disclosure.
Figure 4:
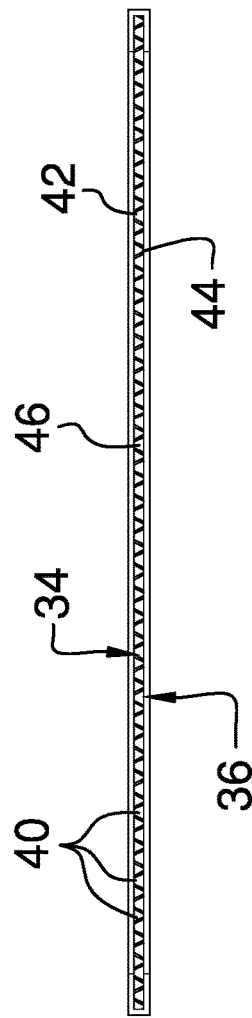
FIG. 4 is a back view of an embodiment of the disclosure.
Figure 5:
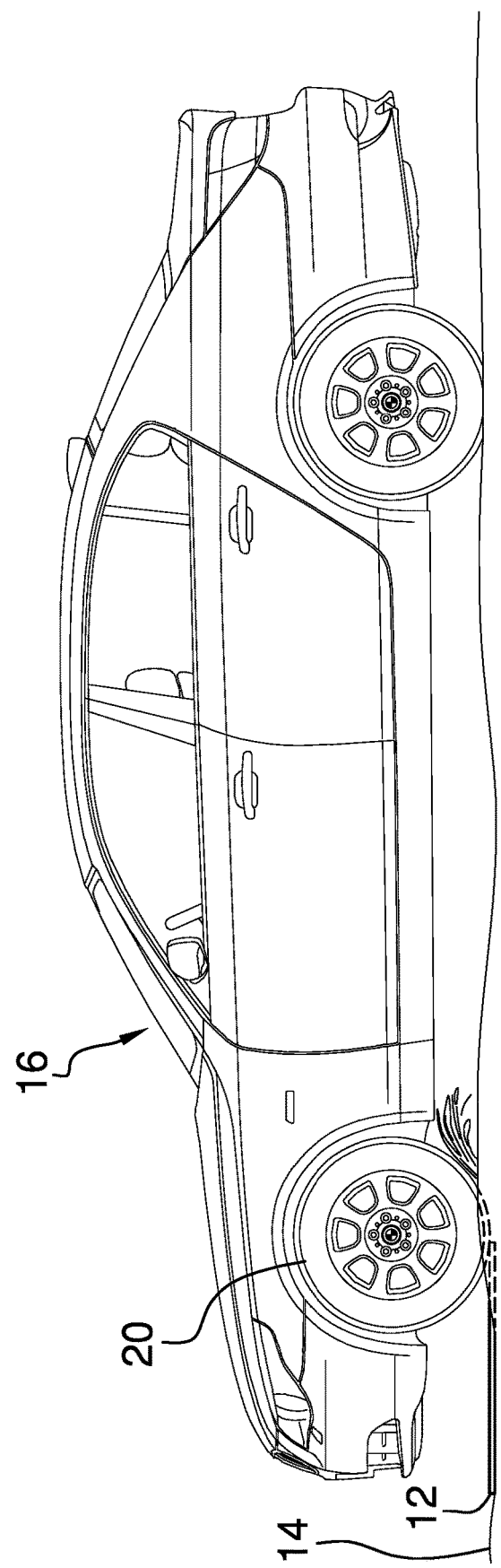
FIG. 5 is a perspective in-use view of an embodiment of the disclosure.

With reference now to the drawings, and in particular to FIGS. 1 through 5 thereof, a new traction device embodying the principles and concepts of an embodiment of the disclosure and generally designated by the reference numeral 10 will be described.

As best illustrated in FIGS. 1 through 5, the tire traction assembly 10 generally comprises a pair of traction frames 12 that can each be positioned on a slippery driving surface 14 upon which a vehicle 16 is not capable of driving due to a loss of traction. The slippery driving surface 14 may be an icy roadway, a snow covered roadway or other similar horizontal driving surface. The vehicle 16 may be a passenger vehicle, a cargo vehicle or any other type of motorized vehicle that employs tires for traction. Each of the traction frames 12 has an open end 18 which can be aligned with a respective tire 20 of the vehicle 16 having each of the traction frames 12 being oriented to extend along a direction of travel of the respective tire 20.

Each of the traction frames 12 comprises a central member 22 which extends between a pair of sidelong members 24. Each of the sidelong members 24 associated with a respective one of the traction frames 12 is oriented perpendicular to the central member 22 associated with the respective traction frames 12 such that each of the traction frames 12 has a U-shape. Additionally, each of the sidelong members 24 associated with the respective traction frames 12 has a distal end 26 with respect to the central member 22 of the respective traction frames 12 and an inwardly facing surface 28. Furthermore, the open end 18 of each of the traction frames 12 is defined between the distal ends 26 of each of the sidelong members 24 of the respective traction frames 12.

The inwardly facing surface 28 of each of the sidelong members 24 associated with the respective traction frames 12 is directed toward each other. The central member 22 of the respective traction frames 12 has an inwardly facing surface 30 that is directed toward the distal end 26 of the sidelong members 24 of the respective traction frames 12. Additionally, each of the sidelong members 24 of the respective traction frames 12 has a length that is greater than a length of the central member 22 of the respective traction frames 12. Each of the traction frames 12 may have a length ranging between approximately 36.0 inches and 48.0 inches and each of the traction frames 12 may have a width ranging between approximately 9.0 inches and 12.0 inches.

A plurality of nets 32 is provided and each of the nets 32 is integrated into a respective one of the traction frames 12. The plurality of nets 32 includes a set of top nets 34 and a set of bottom nets 36. Each of the set of top nets 34 frictionally engages a respective vehicle tire 20 and each of the bottom nets 36 frictionally engages the slippery driving surface 14 when the traction frames 12 are positioned on the slippery driving surface 14. Moreover, each of the top nets 34 and each of the bottom nets 36 is comprised of a resilient material such as steel or other similar material. In this way each of the nets 32 resists being deformed by the weight of the vehicle tire 20.

Each of the top nets 34 and each of the bottom nets 36 has a perimeter edge 38, and the perimeter edge 38 of each of the top nets 34 and each of the bottom nets 36 is coupled to the inwardly facing surface 28 of each of the sidelong members 24 and the inwardly facing surface 28 of the central member 22 associated with a respective one of the traction frames 12. Furthermore, each of the top nets 34 and each of the bottom nets 36 extends between the central member 22 and the distal end 26 of each of the sidelong members 24 associated with the respective traction frames 12. Each of the top nets 34 and the bottom nets 36 is comprised of a plurality of strips 40 that each has a top edge 42, a bottom edge 44 and an outer surface 46 extending between the top edge 42 and the bottom edge 44. Moreover, each of the strips 40 is interlaced having the outer surface 46 of the strips 40 being bonded to the outer surface 46 of an adjacent one of the strips 40 at a plurality of connection points 48. In this way the bottom edge 44 of each of the strips 40 associated with the bottom nets 36 can frictionally engage the slippery driving surface 14 and the top edge 42 of each of the strips 40 associated with the top nets 34 can frictionally engage the respective vehicle tire 20.

Each of the top nets 34 and each of the bottom nets 36 associated with each of the traction frames 12 has a first opening 50 extending through the top nets 34 and the bottom nets 36. The first opening 50 defines a first grip 52 which can be gripped for carrying the traction frames 12. Additionally, the first opening 50 is aligned with a respective one of the sidelong members 24 of the respective traction frames 12. Each of the top nets 34 and the bottom nets 36 associated with each of the traction frames 12 has a second opening 54 extending through the top nets 34 and the bottom nets 36. The second opening 54 defines a second grip 56 which can be gripped for carrying the traction frames 12. Additionally, the second opening 54 is aligned with the central member 22 of the respective traction frames 12.

In use, each of the traction frames 12 is positioned on the slippery driving surface 14 and the open end 18 of each of the traction frames 12 is driven beneath a respective one the vehicle tires 20 that is powered by the vehicle 16. Additionally, each of the traction frames 12 is oriented to extend along the travel path of the respective vehicle tires 20. In this way the respective vehicle tires 20 can gain traction on the top nets 34 in the respective traction frames 12 and the bottom nets 36 in each of the traction frames 12 can frictionally engage the slippery driving surface 14. Thus, the vehicle 16 can drive forward on the slippery driving surface 14 where the vehicle 16 would otherwise not have traction and be incapable of motion. The traction frames 12 can continually be repositioned in front of the respective vehicle tires 20 until such time that the vehicle 16 has driven away from the slippery driving surface 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tire traction assembly for positioning under a vehicle tire on a slippery surface for enhancing traction for the vehicle tire, said assembly comprising:
   a pair of traction frames each being configured to be positioned on a slippery driving surface upon which a vehicle is not capable of driving due to a loss of traction, each of said traction frames having an open end wherein said open end of each of said traction frames is configured to be aligned with a respective tire of the vehicle having each of said traction frames being oriented to extend along a direction of travel of the respective tire; and
   a plurality of nets, each of said nets being integrated into a respective one of said traction frames, said plurality of nets including a set of top nets and a set of bottom nets wherein each of said set of top nets is configured to frictionally engage a respective vehicle tire and each of said bottom nets is configured to frictionally engage the slippery driving surface when said traction frames are positioned on the slippery driving surface, each of said top nets and each of said bottom nets being comprised of a resilient material wherein each of said nets is configured to resist being deformed by the weight of the vehicle tire.

2. The assembly according to claim 1, wherein:
each of said traction frames comprises a central member extending between a pair of sidelong members, each of said sidelong members associated with a respective one of said traction frames being oriented perpendicular to said central member associated with said respective traction frames such that each of said traction frames has a U-shape;
each of said sidelong members associated with said respective said traction frames having a distal end with respect to said central member of said respective traction frames and an inwardly facing surface, said open end of each of said traction frames being defined between said distal end of each of said sidelong members of said respective traction frames;
said inwardly facing surface of each of said sidelong members associated with said respective traction frames being directed toward each other, said central member of said respective traction frames having an inwardly facing surface being directed toward said distal end of said sidelong members of said respective traction frames; and
each of said sidelong members of said respective traction frames having a length being greater than a length of said central member of said respective traction frames.

3. The assembly according to claim 2, wherein each of said top nets and each of said bottom nets has a perimeter edge, said perimeter edge of each of said top nets and each of said bottom nets being coupled to said inwardly facing surface of each of said sidelong members and said inwardly facing surface of said central member associated with a respective one of said traction frames, each of said top nets and each of said bottom nets extending between said central member and said distal end of each of said sidelong members associated with said respective traction frames.

4. The assembly according to claim 2, wherein each of said top nets and said bottom nets associated with each of said traction frames has a first opening extending through said top nets and said bottom nets to define a first grip wherein said first grip is configured to be gripped for carrying said traction frames, said first opening being aligned with a respective one of said sidelong members of said respective traction frames.

5. The assembly according to claim 4, wherein each of said top nets and said bottom nets associated with each of said traction frames has a second opening extending through said top nets and said bottom nets to define a second grip wherein said second grip is configured to be gripped for carrying said traction frames, said second opening being aligned with said central member of said respective traction frames.

6. The assembly according to claim 1, wherein each of said top nets and said bottom nets being comprised of a plurality of strips having a top edge, a bottom edge and an outer surface extending between said top edge and said bottom edge, each of said strips being interlaced having said outer surface of said strips being bonded to said outer surface of an adjacent one of said strips at a plurality of connection points wherein said bottom edge of each of said strips associated with said bottom nets is configured to frictionally engage the slippery driving surface and said top edge of each of said strips associated with said top nets is configured to frictionally engage the respective vehicle tire.

7. A tire traction assembly for positioning under a vehicle tire on a slippery surface for enhancing traction for the vehicle tire, said assembly comprising:

a pair of traction frames each being configured to be positioned on a slippery driving surface upon which a vehicle is not capable of driving due to a loss of traction, each of said traction frames having an open end wherein said open end of each of said traction frames is configured to be aligned with a respective tire of the vehicle having each of said traction frames being oriented to extend along a direction of travel of the respective tire, each of said traction frames comprising a central member extending between a pair of sidelong members, each of said sidelong members associated with a respective one of said traction frames being oriented perpendicular to said central member associated with said respective traction frames such that each of said traction frames has a U-shape, each of said sidelong members associated with said respective said traction frames having a distal end with respect to said central member of said respective traction frames and an inwardly facing surface, said open end of each of said traction frames being defined between said distal end of each of said sidelong members of said respective traction frames, said inwardly facing surface of each of said sidelong members associated with said respective traction frames being directed toward each other, said central member of said respective traction frames having an inwardly facing surface being directed toward said distal end of said sidelong members of said respective traction frames, each of said sidelong members of said respective traction frames having a length being greater than a length of said central member of said respective traction frames; and a plurality of nets, each of said nets being integrated into a respective one of said traction frames, said plurality of nets including a set of top nets and a set of bottom nets wherein each of said set of top nets is configured to frictionally engage a respective vehicle tire and each of said bottom nets is configured to frictionally engage the slippery driving surface when said traction frames are positioned on the slippery driving surface, each of said top nets and each of said bottom nets being comprised of a resilient material wherein each of said nets is configured to resist being deformed by the weight of the vehicle tire, each of said top nets and each of said bottom nets having a perimeter edge, said perimeter edge of each of said top nets and each of said bottom nets being coupled to said inwardly facing surface of each of said sidelong members and said inwardly facing surface of said central member associated with a respective one of said traction frames, each of said top nets and each of said bottom nets extending between said central member and said distal end of each of said sidelong members associated with said respective traction frames, each of said top nets and said bottom nets being comprised of a plurality of strips having a top edge, a bottom edge and an outer surface extending between said top edge and said bottom edge, each of said strips being interlaced having said outer surface of said strips being bonded to said outer surface of an adjacent one of said strips at a plurality of connection points wherein said bottom edge of each of said strips associated with said bottom nets is configured to frictionally engage the slippery driving surface and said top edge of each of said strips associated with said top nets is configured to frictionally engage the respective vehicle tire, each of said top nets and said bottom nets associated with each of said traction frames having a first opening extending through said top nets and said bottom nets to define a first grip wherein said first grip is configured to be gripped for carrying said traction frames, said first opening being aligned with a respective one of said sidelong members of said respective traction frames, each of said top nets and said bottom nets associated with each of said traction frames having a second opening extending through said top nets and said bottom nets to define a second grip wherein said second grip is configured to be gripped for carrying said traction frames, said second opening being aligned with said central member of said respective traction frames.

* * * * *